United States Patent
Kitada et al.

(10) Patent No.: US 9,910,535 B2
(45) Date of Patent: Mar. 6, 2018

(54) TOUCH INPUT DEVICE THAT DETECTS A TOUCH POSITION AND A PRESSING INPUT

(71) Applicant: Murata Manufacturing Co., Ltd., Nagaokakyo-shi, Kyoto-fu (JP)

(72) Inventors: Hiroaki Kitada, Nagaokakyo (JP); Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1 day.

(21) Appl. No.: 15/068,948

(22) Filed: Mar. 14, 2016

(65) Prior Publication Data

US 2016/0195994 A1    Jul. 7, 2016

Related U.S. Application Data

(63) Continuation of application No. PCT/JP2014/075356, filed on Sep. 25, 2014.

(30) Foreign Application Priority Data

Sep. 27, 2013  (JP) .................................. 2013-200848

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04105* (2013.01)

(58) Field of Classification Search
CPC ......... G06F 2203/04105; G06F 3/0414; G06F 3/0416; G06F 3/044
See application file for complete search history.

(56) References Cited

U.S. PATENT DOCUMENTS

| | | | | |
|---|---|---|---|---|
| 6,002,389 | A | * | 12/1999 | Kasser .................... G06F 3/041 178/18.01 |
| 7,511,702 | B2 | * | 3/2009 | Hotelling .............. G06F 3/0414 178/18.06 |

(Continued)

FOREIGN PATENT DOCUMENTS

| | | |
|---|---|---|
| JP | 2000263869 A | 10/2000 |
| WO | WO2012024254 A | 2/2012 |
| WO | WO2013122070 A | 5/2015 |

OTHER PUBLICATIONS

International Search Report PCT/JP2014/075356 dated Nov. 4, 2014.
Written Opinion PCT/JP2014/075356 dated Nov. 4, 2014.

*Primary Examiner* — Ram Mistry
(74) *Attorney, Agent, or Firm* — Arent Fox LLP

(57) ABSTRACT

A touch input device includes a touch panel, a press detection signal generating unit and a touch detection signal generating unit. The touch panel is formed by laminating a piezoelectric sensor and a capacitive sensor. The piezoelectric sensor is connected to the press detection signal generating unit, and the capacitive sensor is connected to the touch detection signal generating unit. The piezoelectric sensor includes a piezoelectric film, and first and second press detecting conductors disposed with the piezoelectric film sandwiched therebetween. The piezoelectric film is disposed such that a polarity of electric charges produced by a press in the piezoelectric film, and a polarity of excited electric charges produced in the piezoelectric film when the capacitive sensor detects a touch become reverse polarities.

11 Claims, 2 Drawing Sheets

(56) References Cited

U.S. PATENT DOCUMENTS

| | | | |
|---|---|---|---|
| 2006/0144154 A1* | 7/2006 | Ueno | G01L 1/16 73/723 |
| 2009/0002199 A1* | 1/2009 | Lainonen | H03K 17/964 341/20 |
| 2009/0309616 A1* | 12/2009 | Klinghult | G06F 3/044 324/686 |
| 2010/0052880 A1* | 3/2010 | Laitinen | G06F 3/016 340/407.2 |
| 2012/0038583 A1* | 2/2012 | Westhues | G06F 3/0412 345/174 |
| 2012/0075226 A1* | 3/2012 | Andoh | G06F 3/046 345/173 |
| 2014/0347304 A1 | 11/2014 | Ando | |
| 2015/0015526 A1* | 1/2015 | Wang | G06F 3/044 345/174 |
| 2015/0070305 A1* | 3/2015 | Seo | G06F 3/0412 345/174 |

\* cited by examiner

TOUCH INPUT DEVICE THAT DETECTS A TOUCH POSITION AND A PRESSING INPUT

CROSS REFERENCE TO RELATED APPLICATIONS

The present application is a continuation of PCT/JP2014/075356 filed Sep. 25, 2014, which claims priority to Japanese Patent Application No. 2013-200848, filed Sep. 27, 2013, the entire contents of each of which are incorporated herein by reference.

TECHNICAL FIELD

The present invention relates to a touch input device that detects a touch position and a pressing input on an operation surface.

BACKGROUND

Conventionally, various touch input devices which each detect a touch position and a press on an operation surface have been devised. For example, Patent Literature 1 discloses a resistive touch panel. The touch panel in Patent Literature 1 includes a first conductive film and a second conductive film including principal surfaces parallel to an operation surface, and the first conductive film and the second conductive film are disposed at an interval in a direction orthogonal to the principal surfaces. When the operation surface is pushed, the first conductive film and the second conductive film contact with each other at a pushed position. The touch input device in Patent Literature 1 detects a touch position based on a partial pressure at this touched position, and detects a press based on the partial pressure and a resistance.

Such a configuration and an operation need a switch circuit which switches a touch position detection circuit and a press detection circuit to the first conductive film and the second conductive film to connect. Further, according to the configuration of Patent Literature 1, if a first electrode film and a second electrode film do not contact, i.e., if the operation surface is not pushed to some degree, it is not possible to detect a position.

Meanwhile, conventionally, a touch input device whose position detection sensor and press detection sensor are formed by using different base members, and which employs a configuration obtained by overlaying the position detection sensor and the press detection sensor has also been devised. According to this configuration, the position detection sensor is connected to a touch position detection circuit, and the press detection sensor is connected to a press detection circuit, and therefore a switch circuit is not necessary. Further, according to this configuration, it is possible to detect a position even when an operation surface is softly touched.

In this regard, by using a capacitive position detection sensor as the position detection sensor, it is possible to detect a touch position based on a change in a capacitance. Even when the operation surface is softly touched, i.e., even when the operation surface is not strongly pushed, it is possible to detect a touch position.

Further, while such a position detection sensor is used, a piezoelectric sensor for which a piezoelectric film is used is used as the press detection sensor in some cases.

PTL 1: Japanese Patent Application Laid-Open No. 2000-283869.

However, a combination of the capacitive position detection sensor and the press detection sensor formed by the piezoelectric sensor causes a following problem.

Electric charges are regularly injected to the position detection sensor to enable the capacitive position detection sensor to measure a capacitance. This injection amount changes according to the capacitance, and therefore changes between the case when a dielectric such as a finger touches the operation surface and the case when the dielectric does not touch the operation surface.

When the position detection sensor and the press detection sensor are disposed close to each other, the press detection sensor and the position detection sensor are capacitively coupled. In this case, electric charges are produced in the press detection sensor due to an influence of part of the electric charges injected to the position detection sensor.

The press detection sensor formed by the piezoelectric sensor detects whether or not there is a press or a pressing force based on electric charges produced when a piezoelectric film is deformed by a press on the operation surface.

Hence, when electric charges produced by the influence of the electric charges of the position detection sensor are produced in the press detection sensor, the press detection sensor erroneously detects these electric charges as electric charges produced by the piezoelectric sensor in response to a press. Therefore, it is not possible to accurately detect a pressing amount in some cases.

SUMMARY OF THE INVENTION

An object of the present invention is to provide a touch input device that can accurately detect a press even for a touch sensor having a capacitive position detection sensor and a press detection sensor formed by a piezoelectric sensor disposed close to each other.

A touch input device according to the present invention includes a position detection sensor, a press detection sensor, a press detection signal generating unit and a touch detection signal generating unit. The position detection sensor is a capacitive sensor, and includes a first position detecting conductor and a second position detecting conductor. The press detection sensor is a so-called piezoelectric sensor, and includes a piezoelectric film, and a first press detecting conductor and a second press detecting conductor disposed with the piezoelectric film sandwiched therebetween. The press detection signal generating unit generates a press detection voltage signal by using an electric charge outputted from the press detection sensor. The touch detection signal generating unit generates a touch detection voltage signal by applying a voltage to the position detection sensor and obtaining the electric charge of the position detection sensor.

The position detection sensor and the press detection sensor are disposed close to each other. The press detection sensor is disposed such that the electric charge produced in the press detection sensor by the voltage applied to the position detection sensor, and the electric charge produced in the press detection sensor in response to a press become reverse polarities.

According to this configuration, electric charges excited in the press detection sensor by the voltage applied to the position detection sensor when there is no press (push), and electric charges produced in the press detection sensor by the press have opposite influences which are given on a voltage value of the press detection voltage signal. When, for example, the electric charges excited by the voltage applied to the position detection sensor cause the press detection voltage signal to function to increase the voltage, the electric charges produced by a press function to decrease the voltage of the press detection voltage signal. Consequently, it is possible to distinguish between a change in a voltage value of the press detection voltage signal caused by the electric charges excited by a touch, and a change in a voltage of the press detection voltage signal caused by the electric charges in response to a press.

Further, preferably, in the touch input device according to the present invention, the first position detecting conductor and the first press detecting conductor are formed on a same plane.

According to this configuration, it is possible to make thin a combined body (touch sensor) on which the position detection sensor and the press detection sensor are laminated.

Further, preferably, in the touch input device according to the present invention, the piezoelectric film is made of a chiral polymer. Furthermore, preferably, in the touch input device according to the present invention, the piezoelectric film is made of polylactic acid stretched in at least a uniaxial direction.

These configurations are a preferable example of the piezoelectric film.

According to the present invention, it is possible to accurately detect a press while using a touch sensor in which a capacitive position detection sensor and a press detection sensor formed by a piezoelectric sensor are disposed close to each other.

DETAILED DESCRIPTION

Figure 1:
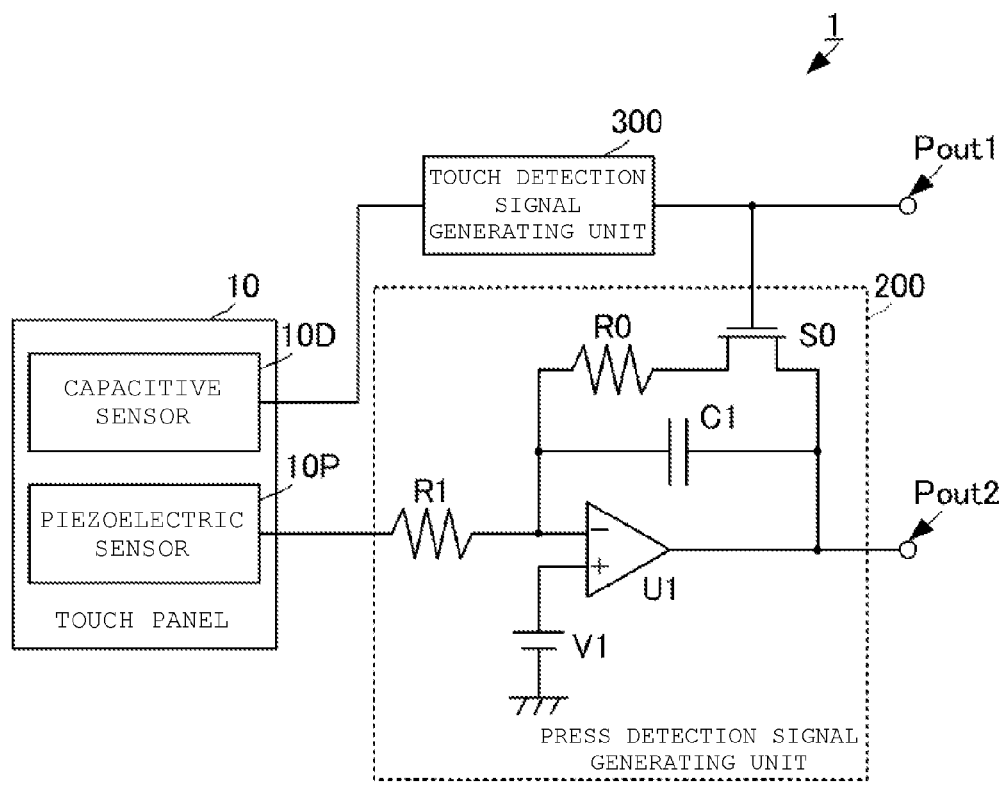
FIG. 1 is a block diagram of a touch input device according to an embodiment of the present invention.

A touch input device according to an embodiment of the present invention will be described with reference to the drawings. FIG. 1 is a block diagram of the touch input device according to the embodiment of the present invention.

Figure 2:
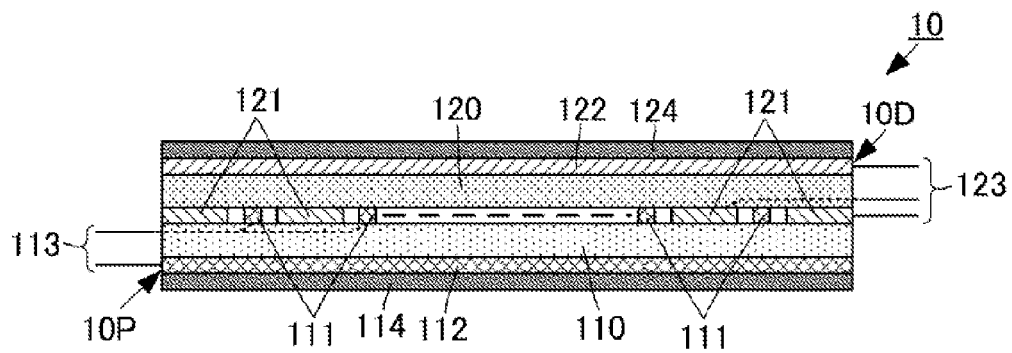
FIG. 2. is a side sectional view illustrating main components of a touch panel according to the embodiment of the present invention.

FIG. 2 is a side sectional view illustrating main components of a touch panel according to the embodiment of the present invention.

A touch input device 1 includes a touch panel 10, a press detection signal generating unit 200 and a touch detection signal generating unit 300. The touch panel 10 includes a piezoelectric sensor 10P and a capacitive sensor 10D. The piezoelectric sensor 10P corresponds to a "press detection sensor" according to the present disclosure, and the capacitive sensor 10D corresponds to a "capacitive position detection sensor" according to the present disclosure.

The touch panel 10 has a flat shape, and includes an operation surface which is at least one principal surface (flat surface) of the flat surface, and receives an operator's operation. The piezoelectric sensor 10P and the capacitive sensor 10D also have flat shapes, and are laminated such that the principal surfaces of the flat shapes are parallel with each other. The capacitive sensor 10D and the piezoelectric sensor 10P are laminated in order from an operation surface side on the touch panel 10 according to the present embodiment.

The piezoelectric sensor 10P includes a piezoelectric film 110, first press detecting conductors 111 and second press detecting conductors 112. The piezoelectric film 110 is made of a material including polylactic acid (PLA) and, more specifically, poly-L-lactic acid (PLLA). In addition, the piezoelectric film 110 needs to be a film having piezoelectricity, and is preferably made of a material including chiral polymers and is more preferably made of a material including PLA and PLLA. In addition, when the piezoelectric film 110 is formed by using PLLA, the piezoelectric film 110 is uniaxially stretched. A piezoelectric constant of the uniaxially stretched PLLA belongs to a group of high piezoelectricities among polymers.

In addition, the stretching ratio is preferably about three to eight times. Applying heat processing after the stretching encourages crystallization of extended chain crystal of polylactic acid, and increase the piezoelectric constant. In addition, when a film is biaxially stretched, it is possible to provide the same effect as that of the uniaxial stretching by varying stretching ratios of respective axes. When, for example, a film is stretched eight times in a given direction serving as an X axis, and the film is stretched two times in a Y axis direction orthogonal to the X axis, it is possible to provide for a piezoelectric constant the substantially same effect obtained when the film is uniaxially stretched four times in the X axis direction. Simply uniaxially stretching a film is likely to break along a stretching axis direction, and therefore it is possible to increase a stretch by biaxially stretching the film as described above. Thus, even when a film is biaxially stretched, if the film is in a state which is substantially equal to a state obtained by uniaxially stretching the film, the film corresponds to polylactic acid stretched in at least the uniaxial direction of the present invention.

Further, PLLA produces piezoelectricity by orientation processing of molecules such as stretching, and does not need to be subjected to polling processing unlike other polymers such as PVDF or piezoelectric ceramics. That is, the piezoelectricity of the PLLA which does not belong to ferroelectrics does not appear due to the ion polarization unlike ferroelectrics such as PVDF and PZT, and derives from a spiral structure which is a characteristics structure of molecules. Hence, the PLLA does not have pyroelectricity included in piezoelectric bodies of the other ferroelectrics, and therefore electric charges are not produced by the pyroelectricity. Further, the PVDF or the like shows a temporal fluctuation of a piezoelectric constant, and the piezoelectric constant remarkably lowers depending on cases. However, the piezoelectric constant of the PLLA is temporarily very stable.

Furthermore, a relative permittivity of the PLLA is about 2.5 and very low, and therefore when d is a piezoelectric constant and $\in^T$ is a permittivity, a piezoelectric output constant (=piezoelectric g constant where $g=d/\in^T$ holds) takes a high value.

In this regard, permittivity $\in_{33T}=13\times\in_0$, the piezoelectric g constant of the PVDF having a piezoelectric constant $d_{31}=25$ pC/N is $g_{31}=0.2172$ Vm/N according to the above equation. Meanwhile, when the piezoelectric g constant of the PLLA having a piezoelectric constant $d_{14}=10$ pC/N is converted into $g_{31}$ and calculated, $d_{14}=2\times d_{31}$ holds, and therefore $d_{31}=5$ pC/N holds and the piezoelectric g constant takes $g_{31}=0.2258$ Vm/N. Consequently, it is possible to provide the same sufficient pressing force (push amount) detection sensitivity as that of the PVDF by using the PLLA having the piezoelectric constant $d_{14}=10$ pC/N. Further, the inventors of the present invention have experimentally obtained the PLLA having $d_{14}=15$ to 20 pC/N. By using this PLLA, it is possible to detect a pressing force with a very high sensitivity.

Further, the PLLA has high translucency. Consequently, by forming the piezoelectric film 110 by using the PLLA, and making the first and second press detecting conductors 111 and 112 described below by using a material having high translucency, it is possible to realize the piezoelectric sensor 10P having translucency.

On a first principal surface of the piezoelectric film, the first press detecting conductors 111 are formed. Further, on a second principal surface of the piezoelectric film 110, the second press detecting electrodes 112 are formed.

By using, for a plurality of these first and second press detecting conductors 111 and 112, any one of an organic electrode whose main component is polythiophene and polyaniline, and inorganic electrodes such as ITO, ZnO, silver nanowires, carbon nanotubes and graphene, it is possible to form a conductor pattern having high translucency. In addition, when translucency is not necessary, an electrode formed by using a silver paste or a metal electrode formed by deposition, sputtering or plating can also be used.

The first and second press detecting conductors 111 and 112 are connected to the press detection signal generating unit 200 via a wiring conductor 113.

The capacitive sensor 10D includes a dielectric substrate 120, first position detecting conductors 121 and second position detecting conductors 122. The dielectric substrate 120 is made of a dielectric material having translucency, and is made of glass, for example.

On a first principal surface of the dielectric substrate 120, in other words, on a surface of the dielectric substrate 120 at a side of the piezoelectric sensor 10P, a plurality of first position detecting conductors 121 is formed. A plurality of first position detecting conductors 121 is each formed in an elongated shape, and each has a shape stretched in a first direction of the first principal surface of the dielectric substrate 120. A plurality of first position detecting conductors 121 is formed respectively by being aligned at intervals in a second direction (a direction orthogonal to the first direction) of the first principal surface.

In addition, the first press detecting electrodes 111 of the above piezoelectric sensor 10P, and the first position detecting conductors 121 of the capacitive sensor 10D are disposed between the piezoelectric film 110 and the dielectric substrate 120, and are disposed at the same positions of the touch sensor 10 in a lamination direction. The first press detecting electrodes 111 and the first position detecting conductors 121 are disposed without touching each other.

On a second principal surface of the dielectric substrate 120, in other words, on a surface of the dielectric substrate 120 at a side of the operation surface, a plurality of second position detecting conductors 122 is formed. A plurality of second position detecting conductors 122 is each formed in an elongated shape, and each has a shape stretched in a second direction of the second principal surface of the dielectric substrate 120. A plurality of second position detecting conductors 122 is formed respectively by being aligned at intervals in the first direction (the direction orthogonal to the second direction) of the second principal surface.

The first and second position detecting conductors 121 and 122 are formed by using transparent electrodes such as ITO. The first and second position detecting conductors 121 and 122 are connected to the touch detection signal generating unit 300 via a wiring conductor pattern 123.

An insulation film 114 is attached to an outer surface of the piezoelectric sensor 10p at the side of the second press detecting electrode 112, and an insulation film 124 is attached to an outer surface (operation surface) of the capacitive sensor 10D at the side of the second position detecting conductors 122.

When a dielectric such as a finger (referred to simply as a finger below) approaches or touches the operation surface of the touch sensor 10 employing this configuration, a capacitance of the capacitive sensor 10D at a touched position changes. This change in the capacitance is detected as a touch detection voltage by the touch detection signal generating unit 300, and the touch detection signal generating unit 300 generates and outputs a touch detection signal taking this voltage value.

The capacitance produced by the capacitive sensor 10D changes according to a distance between the finger and the operation surface or between a touch area of the finger and the operation surface. Therefore, when the touch area does not change, the capacitance is the same irrespectively of whether a pressing force is high or low. That is, depending on whether or not the finger touches the operation surface, the voltage value of the touch detection signal changes. Further, by observing the voltage value of this touch detection signal, it is possible to determine whether or not the operation surface is touched. Furthermore, the first position detecting conductors 121 and the second position detecting conductors 122 are disposed as described above, so that overlapping portions of the first position detecting conductors 121 and the second position detecting conductors 122 are projected on the operation surface as a matrix pattern.

Still further, the capacitance changes the most at the touch position. Consequently, by obtaining a touch detection signal per pair of the first and second position detecting conductors 121 and 122, the capacitive sensor 10D can detect the touch position.

Further, when the finger pushes the operation surface of the touch sensor 10, the piezoelectric film 110 of the piezoelectric sensor 10p deflects according to the pressing force (push amount). The piezoelectric film 110 produces electric charges corresponding to the amount of this deflection. A potential difference is produced between the first and second press detecting conductors 111 and 112 by electric charges as a result of this piezoelectric effect. The press detection signal generating unit 200 generates a press detection signal taking a voltage value including this potential difference.

The touch detection signal generating unit 300 is connected to the capacitive sensor 10D as described above, and includes circuitry to generate a touch detection signal corresponding to a touch detection voltage. In particular, the touch detection signal generating unit 300 can be a circuit that includes comparators and similar circuitry as would be understood to one skilled in the art to compare the output from capacitive sensor 10D with predetermined touch detection threshold. Moreover, the unit can include an electronic storage unit that stores programs for the control process and the threshold value. The unit reads the programs and threshold value and executes the controls and processes. Thus, the electronic storage unit can be used as a computation memory at executing the controls and processes. Moreover, the touch detection signal is a signal binarized into High or Low. Specifically, the touch detection signal generating unit 300 sets a touch detection threshold to the touch detection voltage, and outputs a touch detection signal of a High state in a period in which a touch detection voltage is equal to or more than the touch detection threshold. The touch detection signal generating unit 300 outputs a touch detection signal of a Low state in a period in which the touch detection voltage is not equal to or more (i.e., is less) than the touch detection threshold.

The touch detection signal generating unit 300 outputs a touch detection signal to the press detection signal generating unit 200 and a first output terminal Pout1. In this case, the touch detection signal generating unit 300 needs to output only the touch detection signal to the press detection signal generating unit 200, and outputs the touch detection signal together with information related to a touch position to the first output terminal Pout1.

As shown in FIG. 2, the press detection signal generating unit 200 includes an operational amplifier U1, a resistor R1, a capacitor C1, a discharge resistor R0 and a switch element S0. An inverting input terminal of the operational amplifier U1 is connected to the piezoelectric sensor 10P via the resistor R1.

Hence, a signal having a potential difference produced by the piezoelectric sensor 10P is inputted to the inverting input terminal of the operational amplifier U1 via the resistor R1. A reference potential V1 is applied to a non-inverting input terminal of the operational amplifier U1.

An output terminal of the operational amplifier U1 is connected to a second output terminal Pout2 of the touch input device 1. The capacitor C1 is connected between the inverting input terminal and the output terminal of the operational amplifier U1. The discharge resistor R0 and the switch element S0 are connected in series, and this serial circuit is connected in parallel to the capacitor C1.

On and off of the switch element S0 is controlled according to High or Low of the touch detection signal. For example, the switch element S0 enters an ON state when the touch detection signal is in a Low state, and enters an OFF state when the touch detection signal is in a High state. More specifically, the switch element S0 is realized by a normally-on FET, for example.

Thus, control to turn on the switch element S0 is performed in a period in which the touch detection signal of the Low state is inputted, and control to turn off the switch element S0 is performed in a period in which the touch detection signal of the High state is inputted. That is, control to turn on the switch element S0 is performed in a period in which the touch is not detected, and control to turn off the switch element S0 is performed in a period in which the touch is detected.

In addition, when a normally-on element is used for the switch element S0, a touch detection signal taking the above binary value needs to be used. However, when a normally-off element is used for the switch element S0, a binary state of the touch detection signal needs to be inverted. That is, a touch detection signal which enters the Low state in a period in which a touch is detected and which enters a High state in a period in which a touch is not detected needs to be used.

By employing such a circuit configuration, in a period in which the switch element S0 is in an OFF state, an integration circuit formed by the operational amplifier U1, the resistor R1 and the capacitor C1 is formed in the press detection signal generating unit 200. Hence, the press detection signal generating unit 200 integrates a difference between potentials produced by the piezoelectric sensor 10P, and the reference potential, and outputs a press detection signal which is an integration result, to the second output terminal Pout2.

That is, in a period in which a touch is detected, the press detection signal generating unit 200 integrates differences between potentials produced by the piezoelectric sensor 10P, and the reference potential. Further, the press detection signal generating unit 200 outputs the press detection signal which is this integration result, to the second output terminal Pout2.

Meanwhile, when the switch element S0 is in the ON state, a circuit configuration with the capacitor C1 and the discharge resistor R0 connected in parallel is employed. Thus, the press detection signal generating unit 200 stops functioning as the integration circuit. Hence, the press detection signal generating unit 200 outputs a signal based on a potential produced by the piezoelectric sensor 10P as is, to the second output terminal Pout2. Further, a closed-loop circuit formed by the capacitor C1 and the discharge resistor R0 is configured, so that electric charges stored in the capacitor C1 are discharged and consumed by the discharge resistor R0. Hence, the potential of the output terminal Pout2 is reset to the reference potential.

That is, in a period in which a touch is detected, the press detection signal generating unit 200 resets the potential of the second output terminal Pout2 to the reference potential.

In the touch input device 10 employing such a configuration, the first position detecting conductors 121 of the capacitive sensor 10D and the first press detecting electrodes 111 of the piezoelectric sensor 10P are close to each other. Therefore, as the problem is described above, electric charges produced by the capacitive sensor 10D excite electric charges in the piezoelectric sensor 10P. That is, electric charges excited in response to detection of a touch are produced.

Figure 3A:
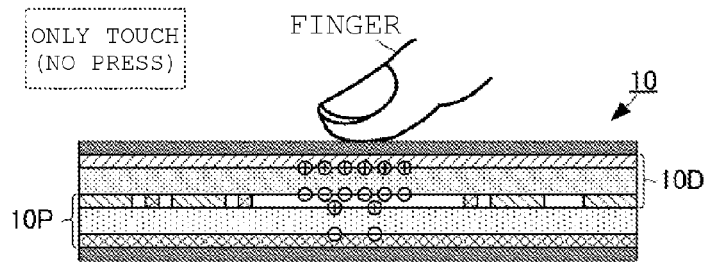
FIGS. 3(A) and 3(b) are views for explaining a principal for detecting electric charges produced by a press on the touch input device according to the embodiment of the present invention.
Figure 3B:
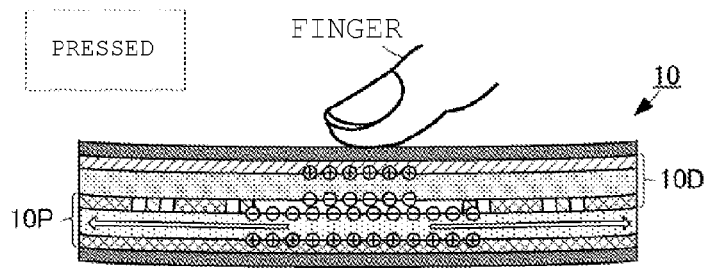

However, even in case where the excited electric charges are produced, by employing the following configuration, it is possible to accurately detect electric charges produced when the piezoelectric film 110 deflects. FIGS. 3(A) and 3(B) are views for explaining a principal for detecting electric charges produced by a press on the touch input device according to the embodiment of the present invention.

The piezoelectric film 110 of the piezoelectric sensor 10P produces electric charges corresponding to a deflection amount when deflection occurs as described above. In this regard, the electric charge amount is determined based on a relationship between a deflection direction and a uniaxial stretching direction, and a deflection amount. Further, the polarity at which electric charges are produced is determined based on a relationship between the deflection direction and the uniaxial stretching direction.

Hence, the polarity of electric charges produced by the piezoelectric film 110 in response to a press, and the polarity of excited electric charges produced in the piezoelectric film 110 are made to have reverse polarities.

In, for example, a case illustrated in FIGS. 3(A) and 3(B), when the finger touches (or approaches) the operation surface, the first position detecting conductors 121 and the second position detecting conductors 122 are connected to the touch detection signal generating unit 300 and are applied voltages by the touch detection signal generating unit 300 via the wiring conducting pattern 123, such that the first position detecting conductor 121 side of the dielectric substrate 120 are charged with negative electric charges and the second position detecting conductor 122 side of the dielectric substrate 120 are charged with positive electric charges.

In this case, as illustrated in FIG. 3(A), the first press detecting conductor 111 side of the piezoelectric film 110 is charged with positive electric charges, and the second press detecting conductor 112 side of the piezoelectric film 110 is charged with negative electric charges.

Hence, as illustrated in FIG. 3(B), a uniaxial stretching direction is set to the piezoelectric film 110 such that the first press detecting conductor 111 side is charged with negative electric charges, and the second press detecting conductor 112 side is charged with positive electric charges in response to a press on the operation surface.

Figure 4:
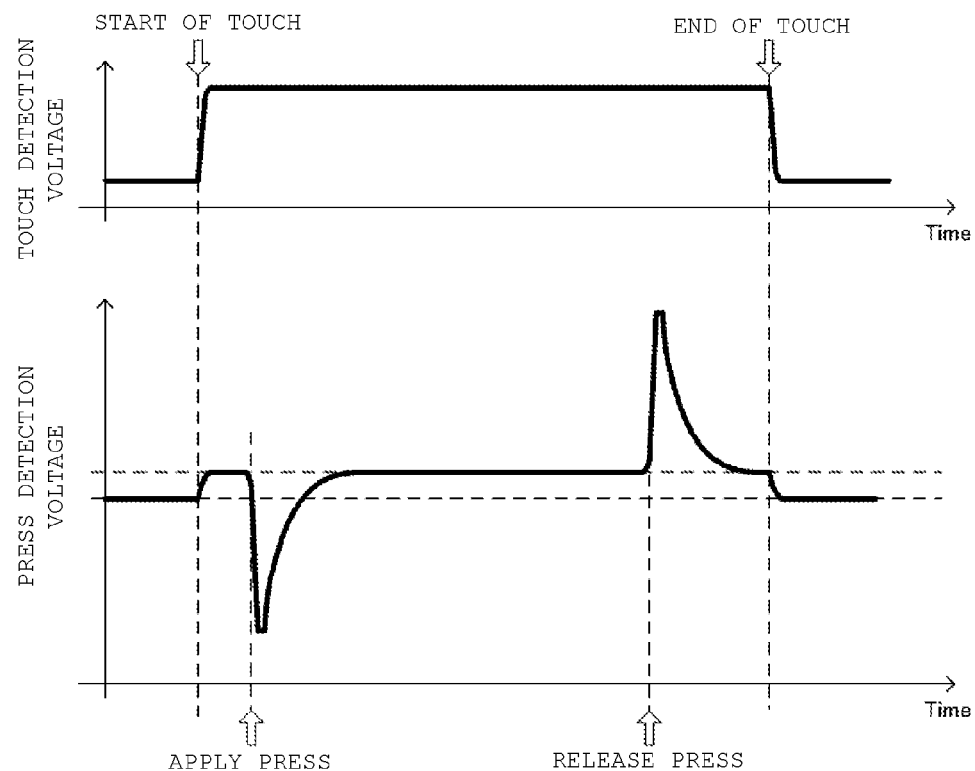
FIG. 4 is a waveform diagram of a touch detection voltage and a press detection voltage detected by the touch input device according to the embodiment of the present invention.

By using such a configuration, a touch detection voltage and a press detection voltage (a voltage value of the press detection signal) have waveforms illustrated in FIG. 4. FIG. 4 is a waveform diagram of a touch detection voltage and a press detection voltage detected by the touch input device according to the embodiment of the present invention.

When the above configuration is employed and the finger touches the operation surface, the touch detection voltage rises. Consequently, it is possible to detect a touch of the finger on the operation surface. Simultaneously, the press detection voltage also rises from a reference voltage. However, as described above, when a press is applied, the piezoelectric sensor 10P is configured to produce a negative voltage. Consequently, even when the press detection voltage rises from the reference voltage, it is possible to determine that the rise is not caused by the press.

Next, when the operation surface is pushed by a finger (the press is applied), the press detection voltage lowers from a second reference voltage obtained by adding a voltage of excited electric charges to the reference voltage according to a pressing force. Consequently, by detecting a decrease in this press detection voltage, it is possible to detect that the operation surface has been pushed (pressed). Further, by detecting a voltage decrease amount, it is possible to detect the pressing force. In addition, the press detection voltage rises in such a way that the press detection voltage gradually returns to the second reference voltage according to a constant of the integration circuit included in the press detection signal generating unit 200.

Next, when the push of the finger on the operation surface is released (the press is released), the press detection voltage rises from the second reference voltage. Consequently, by detecting a decrease in this press detection voltage, it is possible to detect that the push on the operation surface has been released.

In addition, the press detection voltage lowers in such a way that the press detection voltage gradually returns to the second reference voltage according to a constant of the integration circuit included in the press detection signal generating unit 200.

Next, when the finger is moved away from the operation surface, the touch detection voltage lowers. Consequently, it is possible to detect a touch of the finger on the operation surface. Simultaneously, the press detection voltage also lowers to the reference voltage, and can return to a press detection standby state.

As described above, by employing the configuration according to the present embodiment, even a touch sensor in which a capacitive position detection sensor and a press detection sensor formed by a piezoelectric sensor are disposed close to each other can accurately detect a press.

In addition, in the above embodiment, the first position detecting conductors 121 of the capacitive position detection sensor and the first press detecting conductors 111 of the press detection sensor are disposed on the same plane, i.e., on the piezoelectric film 110. However, the present embodiment is not limited to this. For example, even in case of a touch sensor including an adhesive layer between the first position detecting conductors 121 of the capacitive position detection sensor and the first press detecting conductors 111 of the press detection sensor, the capacitive position detection sensor and the press detection sensor formed by the piezoelectric sensor are disposed close to each other. Accordingly, a technical idea of the present invention is effective. However, to make the touch sensor thinner, it is preferably to dispose the first position detecting conductors 121 and the first press detecting conductors 111 on the same plane.

Further, by adopting a structure in which the first position detecting conductors 121 and the first press detecting conductors 111 are disposed on one surface of the piezoelectric film 110 and disposing the second position detecting conductors 122 and the second press detecting conductors 112 on the other surface of the piezoelectric film 110 without using the dielectric substrate 120, it is possible to form a thinner touch sensor.

DESCRIPTION OF REFERENCE SYMBOLS

1: TOUCH INPUT DEVICE
10: TOUCH SENSOR
10D: CAPACITIVE SENSOR
10P: PIEZOELECTRIC SENSOR
110: PIEZOELECTRIC FILM
111: FIRST PRESS DETECTING CONDUCTOR
112: SECOND PRESS DETECTING CONDUCTOR
113: WIRING CONDUCTOR PATTERN
114: INSULATION FILM
120: DIELECTRIC SUBSTRATE
121: FIRST POSITION DETECTING CONDUCTOR
122: SECOND POSITION DETECTING CONDUCTOR
123: WIRING CONDUCTOR PATTERN
124: INSULATION FILM
200: PRESS DETECTION SIGNAL GENERATING UNIT
300: TOUCH DETECTION SIGNAL GENERATING UNIT

The invention claimed is:
1. A touch input device comprising:
a capacitive position detection sensor that includes first and second position detecting conductors;
a press detection sensor that includes a piezoelectric film and first and second press detecting conductors disposed on opposite surfaces of the piezoelectric film;
a press detection circuit configured to generate a press detection voltage signal based on an electric charge output from the press detection sensor; and
a touch detection circuit having an output coupled to the press detection circuit and being configured to generate a touch detection signal by applying a voltage to the position detection sensor and obtaining an electric charge output from the position detection sensor,
wherein the position detection sensor and the press detection sensor are positioned with respect to each other, such that the electric charge produced in the press detection sensor by the voltage applied to the position detection sensor is reverse polarity with respect to the electric charge produced in the press detection sensor in response to a pressing force.

2. The touch input device according to claim 1, wherein the capacitive position detection sensor is disposed on the press detection sensor.

3. The touch input device according to claim 2, wherein the first position detecting conductor and the first press detecting conductor are disposed on a same plane.

4. The touch input device according to claim 3, wherein each of the first position detecting conductor and the first press detecting conductor comprise a plurality of conductors alternatively disposed with respect to one another.

5. The touch input device according to claim 1, wherein the piezoelectric film comprises a chiral polymer.

6. The touch input device according to claim 5, wherein the piezoelectric film comprises polylactic acid stretched in at least a uniaxial direction.

7. The touch input device according to claim 1, wherein the capacitive position detection sensor comprises a dielectric substrate with the first and second position detecting conductors disposed on opposites sides of the dielectric substrate.

8. The touch input device according to claim 1, wherein the press detection circuit comprises an operational amplifier having an inverting input terminal coupled to the press detection sensor, a non-inverting input terminal coupled to a reference potential, and an output terminal coupled to an output of the press detection circuit.

9. The touch input device according to claim 8, wherein the press detection circuit further comprises a switch element controlled by a signal applied by the output of the touch detection circuit, with the switch element coupled to the inverting input terminal of the operational amplifier and the output of the operational amplifier.

10. The touch input device according to claim 9, wherein the touch detection circuit is configured to compare a voltage from the position detection sensor with a touch detection threshold voltage and output the signal at a High state when the voltage from the position detection sensor is equal to or greater than the touch detection threshold voltage and output the signal at a Low state when the voltage from the position detection sensor is less than the touch detection threshold voltage.

11. The touch input device according to claim 10, wherein, when the signal is at the High state, the switch element is turned off, and, when the signal is at the Low state, the switch element is turned on.

\* \* \* \* \*